United States Patent
Feng

(10) Patent No.: US 11,219,044 B2
(45) Date of Patent: Jan. 4, 2022

(54) METHOD FOR SENDING UPLINK CONTROL INFORMATION, TERMINAL, AND BASE STATION

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 48 days.

(21) Appl. No.: 15/778,602

(22) PCT Filed: Mar. 22, 2016

(86) PCT No.: PCT/CN2016/077011
§ 371 (c)(1),
(2) Date: May 23, 2018

(87) PCT Pub. No.: WO2017/161502
PCT Pub. Date: Sep. 28, 2017

(65) Prior Publication Data
US 2018/0352560 A1      Dec. 6, 2018

(51) Int. Cl.
*H04W 72/12*   (2009.01)
*H04W 72/04*   (2009.01)

(52) U.S. Cl.
CPC ... *H04W 72/1257* (2013.01); *H04W 72/0413* (2013.01); *H04W 72/1284* (2013.01); *H04W 72/042* (2013.01); *H04W 72/0446* (2013.01)

(58) Field of Classification Search
CPC ......... H04W 72/1257; H04W 72/0413; H04W 72/1284; H04W 72/0446; H04W 72/042
See application file for complete search history.

(56) References Cited

U.S. PATENT DOCUMENTS 9,955,462 B2 *   4/2018   Chen .................... H04L 5/0055
10,028,299 B2 *  7/2018   Cai ..................... H04W 72/1268
(Continued)

FOREIGN PATENT DOCUMENTS

CN        102342049 A      2/2012
CN        104113905 A      10/2014
(Continued)

OTHER PUBLICATIONS

Supplementary European Search Report in the European application No. 16894857.8, dated May 2, 2019.
(Continued)

*Primary Examiner* — Thinh D Tran
(74) *Attorney, Agent, or Firm* — Ladas & Parry, LLP

(57) ABSTRACT

Embodiments of the present invention provide a method for sending uplink control information, and a terminal. The method comprises: a terminal determines, according to first instruction information sent by a base station, a first time resource that is located on a target carrier and that is used for sending uplink control information; the terminal determines, according to second instruction information sent by the base station, a second time resource that is located on the target carrier and that is used for sending downlink data, the first time resource at least partially overlapped with the second time resource; and the terminal determines a third time resource used for sending the uplink control information, the third time resource following the second time resource and having a preset time interval with the second time resource.

17 Claims, 8 Drawing Sheets

(56) References Cited

U.S. PATENT DOCUMENTS

| | | | |
|---|---|---|---|
| 2010/0222068 A1* | 9/2010 | Gaal | H04W 56/0045 455/450 |
| 2012/0213187 A1* | 8/2012 | Yang | H04W 72/0413 370/329 |
| 2013/0279433 A1 | 10/2013 | Dinan | |
| 2013/0279434 A1 | 10/2013 | Dinan | |
| 2013/0279435 A1 | 10/2013 | Dinan | |
| 2014/0050205 A1 | 2/2014 | Ahn et al. | |
| 2014/0056271 A1 | 2/2014 | Ahn et al. | |
| 2014/0126475 A1 | 5/2014 | Ahn | |
| 2015/0023296 A1 | 1/2015 | Gaal et al. | |
| 2015/0071222 A1 | 3/2015 | Ahn et al. | |
| 2015/0131590 A1 | 5/2015 | Dinan | |
| 2015/0146660 A1 | 5/2015 | Dinan | |
| 2015/0181547 A1 | 6/2015 | Dinan | |
| 2015/0365214 A1 | 12/2015 | Ahn et al. | |
| 2016/0044652 A1 | 2/2016 | Xue et al. | |
| 2016/0050667 A1 | 2/2016 | Papasakellariou et al. | |
| 2016/0057664 A1 | 2/2016 | Ahn et al. | |
| 2016/0080126 A1 | 3/2016 | Dinan | |
| 2016/0192361 A1 | 6/2016 | Dinan | |
| 2016/0233992 A1 | 8/2016 | Ahn et al. | |
| 2016/0249299 A1 | 8/2016 | Ahn et al. | |
| 2016/0316440 A1 | 10/2016 | Dinan | |
| 2016/0380736 A1 | 12/2016 | Ahn et al. | |
| 2017/0230158 A1 | 8/2017 | Ahn et al. | |
| 2017/0295572 A1 | 10/2017 | Ahn et al. | |
| 2017/0324530 A1 | 11/2017 | Ahn et al. | |
| 2017/0367058 A1* | 12/2017 | Pelletier | H04W 56/0045 |
| 2018/0014263 A1 | 1/2018 | Dinan | |
| 2018/0206223 A1* | 7/2018 | Kim | H04W 72/044 |
| 2018/0249427 A1 | 8/2018 | Dinan | |
| 2018/0323930 A1 | 11/2018 | Ahn et al. | |

FOREIGN PATENT DOCUMENTS

| | | |
|---|---|---|
| CN | 104301273 A | 1/2015 |
| CN | 104869653 A | 8/2015 |
| CN | 104969504 A | 10/2015 |
| CN | 105101446 A | 11/2015 |
| CN | 105207754 A | 12/2015 |
| KR | 20100091130 A | 8/2010 |
| WO | 2010101939 A2 | 9/2010 |
| WO | 2014169650 A1 | 10/2014 |
| WO | 2015131730 A1 | 9/2015 |
| WO | 2016028060 A1 | 2/2016 |

OTHER PUBLICATIONS

English translation of the Written Opinion of the International Search Authority in the international application No. PCT/CN2016/077011, dated Dec. 15, 2016.

OPPO, PUCCH transmission on eLAA carrier [online], 3GPP TSG-RANWG1#84 R1-160594, the Internet<URL:http://www.3gpp.org/ftp/tsg_ran/WG1_RL1/TSGR1_84/Docs/R1-160594.zip>, Feb. 6, 2016.

OPPO, HARQ-ACK transmission on eLAA carrier [online], 3GPP TSG-RAN WG1#84 R1-160595, the Internet<URL http://www.3gpp.org/ftp/tsg_ran/WG1_RL1/TSGR1_84/Docs/R1-160595.zip>, Feb. 6, 2016.

First Office Action of the Japanese application No. 2018-532253, dated Apr. 10, 2020.

First Office Action of the Chinese application No. 201680064976.2, dated Jun. 3, 2020, with search report.

First Office Action of the Indian application No. 201817028157, dated Jun. 30, 2020.

CATT, "Support of PUCCH for LAA Scell", 3GPP TSG RAN WG1 Meeting #84 R1-160357, St Julian's, Malta, Feb. 15-19, 2016.

LG Electronics, "PUCCH transmission in LAA", 3GPP TSG RAN WG1 Meeting #84 R1-160627, St Julian's, Malta, Feb. 15-19, 2016.

International Search Report in international application No. PCT/CN2016/077011, dated Dec. 15, 2016.

The International Search Authority in international application No. PCT/CN2016/077011, dated Dec. 15, 2016.

OPPO; "SR/P-CSI transmission on eLAA carrier", 3GPP TSG RAN WG1 Meeting #84bis, R1-162318, Busan, Korea Apr. 11-15, 2016.

Second Office Action of the Japanese application No. 2018-532253, dated Oct. 30, 2020.

Office Action of the Taiwanese application No. 106109537, dated Dec. 1, 2020.

* cited by examiner

METHOD FOR SENDING UPLINK CONTROL INFORMATION, TERMINAL, AND BASE STATION

RELATED APPLICATION

This application is an application under 35 U.S.C. 371 of International Application No. PCT/CN2016/077011 filed on Mar. 22, 2016, the entire contents of which are incorporated herein by reference.

TECHNICAL FIELD

Embodiments of the disclosure relate to the field of wireless communications, and more particularly, to a method for sending uplink control information, a terminal and a base station.

BACKGROUND

Uplink control information (which may also be referred to as uplink control signaling) in a Long Term Evolution (LTE) system mainly includes a Scheduling Request (SR), Channel State Information (CSI), Acknowledgement (ACK)/Negative. Acknowledgement (NACK) information in a Hybrid Automatic Repeat request (HARQ) process and the like. Specifically, the SR is signaling through which a terminal requests a base station for an uplink radio resource. The CSI is information reflecting a channel state between the base station and the terminal. The ACK/NACK information is configured to feed back a receiving condition of data sent by the base station. For example, the terminal receives a Physical Downlink Shared Channel (PDSCH) and demodulates and decodes a Transport Block (TB) born therein. If a decoding result is correct, the terminal may feed back ACK information to the base station. If the decoding result is wrong, the terminal may feed back NACK information to the base station.

Uplink control information may be independently transmitted through a Physical Uplink Control Channel (PUCCH), and may also be transmitted together with uplink data through a Physical Uplink Shared Channel (PUSCH).

A wireless cellular system may use an unlicensed frequency band (for example, 2.4 GHz and 5.8 GHz) to extend a frequency range available for the cellular system. Use of the unlicensed frequency band may be implemented by a License Assisted Access (LAA) technology.

LAA mainly has the following characteristics: (1) a carrier of an unlicensed frequency band is required to be aggregated with a carrier of a licensed frequency band for use, and the carrier of the unlicensed frequency band may serve as an auxiliary carrier only; and (2) the carrier of the unlicensed frequency band may be used only by contention, for example, before data is transmitted on the unlicensed frequency band, a sender is required to perform Listen Before Talk (LBT) detection on the carrier of the unlicensed frequency band and may transmit the data through the carrier only after determining that the carrier is in an idle state.

After detecting that a carrier is idle on an unlicensed frequency band, a base station may transmit data on multiple continuous downlink subframes of the carrier, the multiple continuous downlink subframes are usually called as downlink bursts, and downlink data transmitted on the downlink bursts may be called as downlink burst data. A time resource length occupied by a downlink burst is variable and related to traffic to be transmitted and a maximum single occupation time length predetermined by a protocol. In a conventional art, unlink control information is usually sent on an unlicensed frequency band according to a predetermined period, and there may exist a collision between downlink data sent according to the period and a time resource of downlink burst data sent by a base station. Therefore, there is an urgent need for providing a solution to a time resource collision between uplink control information and downlink data on an unlicensed frequency band.

SUMMARY

The application provides a method for sending uplink control information, a terminal and a base station, so as to provide a solution to a time resource collision between uplink control information and downlink data.

In a first aspect, there is provided a method for sending uplink control information, which may include that: a terminal determines a first time resource, which is configured to transmit uplink control information, on a target carrier according to first indication information sent by a base station; the terminal determines a second time resource, which is configured to transmit downlink data, on the target carrier according to second indication information sent by the base station, wherein the first time resource and the second time resource may be at least partially overlapped; and the terminal determines a third time resource configured to transmit the uplink control information, the third time resource being located after the second time resource and having a preset time interval with the second time resource.

In a second aspect, there is provided a method for sending uplink control information, which may include that: a base station sends first indication information to a terminal, the first indication information indicating a first time resource, which is configured to transmit uplink control information, on a target carrier; the base station sends second indication information to the terminal, the second indication information indicating a second time resource, which is configured to transmit downlink data, on the target carrier, wherein the first time resource and the second time resource may be at least partially overlapped; and the base station determines a third time resource configured to transmit the uplink control information, the third time resource being located after the second time resource and having a preset time interval with the second time resource.

In a third aspect, there is provided a terminal, which may include: a first determination unit configured to determine a first time resource, which is configured to transmit uplink control information, on a target carrier according to first indication information sent by a base station; a second determination unit configured to determine a second time resource, which is configured to transmit downlink data, on the target carrier according to second indication information sent by the base station, wherein the first time resource and the second time resource may be at least partially overlapped; and a third determination unit configured to determine a third time resource configured to transmit the uplink control information, the third time resource being located after the second time resource and having a preset time interval with the second time resource.

In a fourth aspect, there is provided a base station, which may include: a first transceiver unit configured to send first indication information to a terminal, the first indication information indicating a first time resource, which is configured to transmit uplink control information, on a target carrier; a second transceiver unit configured to send second indication information to the terminal, the second indication information indicating a second time resource, which is configured to transmit downlink data, on the target carrier, wherein the first time resource and the second time resource may be at least partially overlapped; and a first determination unit configured to determine a third time resource configured to transmit the uplink control information, the third time resource being located after the second time resource and having a preset time interval with the second time resource.

In a fifth aspect, there is provided a computer-readable medium having stored thereon program codes which are executable by a terminal, the program codes including instructions for executing the method in the first aspect.

In a sixth aspect, there is provided a computer-readable medium having stored thereon program codes which are executable by a base station, the program codes including instructions for executing the method in the second aspect.

In the application, responsive to a condition that there exists a collision between the first time resource (time resource configured to transmit the uplink control information) and the second time resource (time resource sending the downlink data), the terminal re-determines the third time resource configured to transmit the uplink control information, the third time resource being located after the second time resource and having the preset time interval with the second time resource. Such a collision scheme not only ensures one-time sending of the downlink data but also avoids the uplink control information being directly discarded, avoid an unnecessary LB process compared with a solution of sending the downlink data in many times, and may reduce a probability that the uplink control information is discarded compared with a solution of directly discarding the uplink control information.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skilled in the art according to these drawings without creative work.

DETAILED DESCRIPTION

Figure 1:
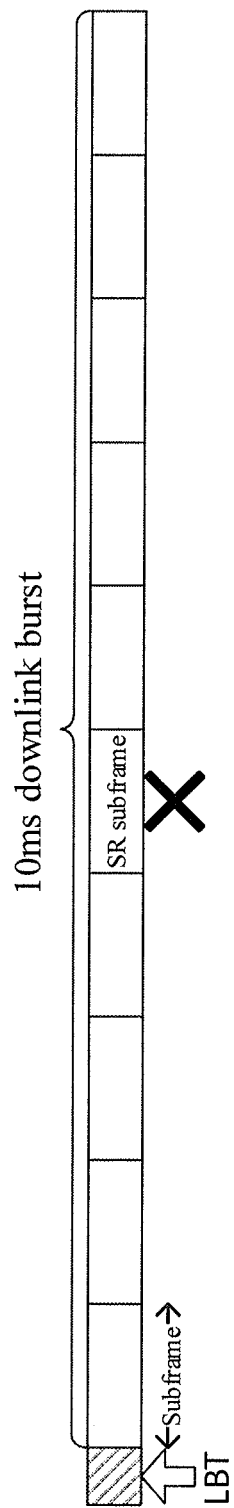
FIG. 1 is an example diagram of a time resource occupation condition of a target carrier on an unlicensed frequency spectrum.

FIG. 1 is an example diagram of a time resource (or called as time-domain resource) occupation condition of a target carrier on an unlicensed frequency spectrum. Before sending downlink data, a base station is required to execute an LBT process to monitor whether a channel is idle or not at first. After the base station acquires a channel resource, the base station starts sending the downlink data. From FIG. 1, it can be seen that the base station is required to send downlink burst data in 10 continuous subframes (i.e., a 10 ms downlink burst). If a terminal may send uplink control information (for example, an SR in FIG. 1) in 5 subframes in the 10 subframes according to a predetermined period, and at this moment, there may exist a collision between a time resource sending the uplink control information and a time resource sending the downlink data.

In an example, the terminal may not transmit an SR or periodic CSI (CSI may be divided into periodic CSI and nonperiodic CSI) in the fifth subframe, and the base station continues sending the downlink data until the downlink burst ends. Therefore, division of a large downlink burst into multiple small downlink bursts may be avoided, and a number of LBT processes may be reduced. However, such a method may cause the terminal to discard the uplink control information and bring an adverse consequence. For example, the uplink control information is an SR, and if the terminal discards the SR, the base station may not timely learn about a service request of the terminal, so that a service delay is prolonged. For another example, the uplink control information is periodic CSI, and if the terminal discards the periodic CSI, the base station may not timely learn about a channel state and thus may not timely regulate scheduling information (for example, a modulation and coding level and precoding) according to the channel state, so that transmission efficiency is reduced.

Figure 2:
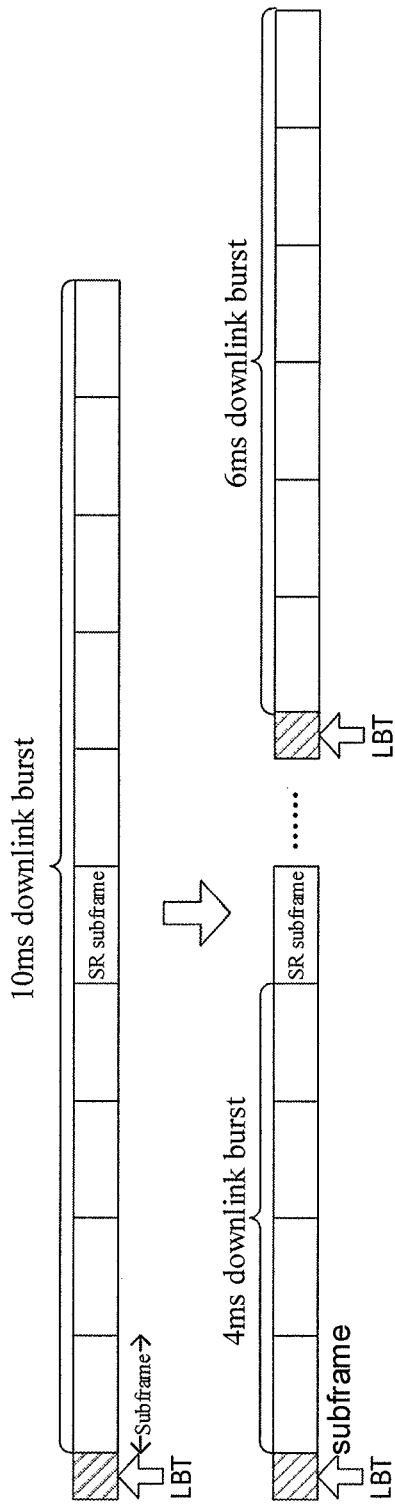
FIG. 2 is an example diagram of a collision scheme.

In another example, the base station may divide a large downlink burst into multiple small downlink bursts by scheduling, as shown in FIG. 2. Such a manner may avoid the uplink control information being discarded. However, for dividing the large downlink burst into the multiple small downlink bursts, the base station requires an additional LBT process, so that downlink transmission efficiency is reduced.

Figure 3:
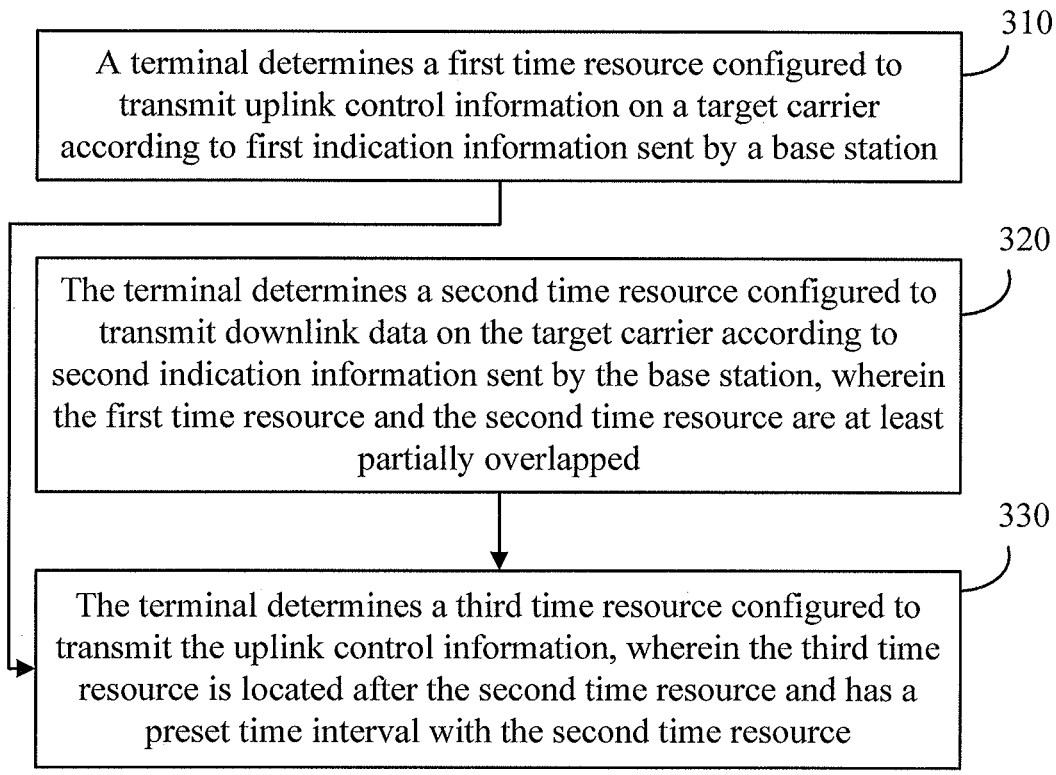
FIG. 3 is a schematic flowchart of a method for sending uplink control information according to an embodiment of the disclosure.

FIG. 3 is a schematic flowchart of a method for sending uplink control information according to an embodiment of the disclosure. The method of FIG. 3 includes the following operations.

In 310, a terminal determines a first time resource, which is configured to transmit uplink control information, on a target carrier according to first indication information sent by a base station.

In some embodiments, the target carrier may be a carrier on an unlicensed frequency band.

In 320, the terminal determines a second time resource, which is configured to transmit downlink data, on the target carrier according to second indication information sent by the base station. Here, the first time resource and the second time resource are at least partially overlapped.

In 330, the terminal determines a third time resource configured to transmit the uplink control information. The third time resource is located after the second time resource and has a preset time interval with the second time resource.

Figure 4:
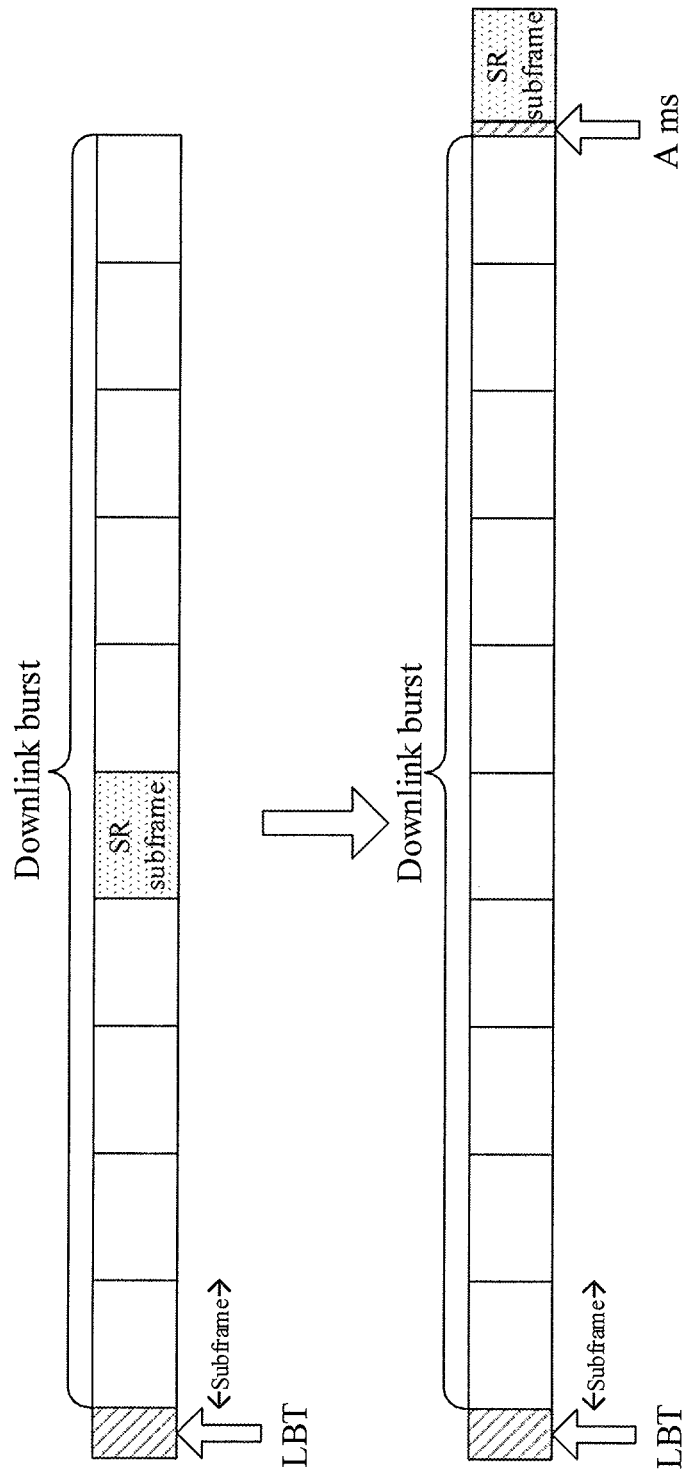
FIG. 4 is an example diagram of a collision scheme according to an embodiment of the disclosure.

Specifically, referring to FIG. 4, the first time resource is 10 subframes (10 ms) corresponding to a downlink burst, and the second time resource is the fifth subframe of the downlink burst (for example, an SR subframe may practically be a subframe configured to transmit periodic CSI and a subframe configured to transmit an ACK/NACK). From FIG. 4, it can be seen that the SR subframe moves from a position after the fifth subframe in the downlink burst to A ms (that is, the preset time interval is A ms) after the end of the downlink burst. In an embodiment, the preset time interval may be a predetermined time interval, or, the preset time interval may be a time interval preconfigured between the base station and UE.

The embodiment of the disclosure provides a collision scheme. Responsive to a condition that there exists a collision between the first time resource (time resource configured to transmit the uplink control information) and the second time resource (time resource sending the downlink data), the terminal re-determines the third time resource configured to transmit the uplink control information. The third time resource is located after the second time resource and has the preset time interval with the second time resource. Such a collision scheme not only ensures one-time sending of the downlink data but also avoids the uplink control information being directly discarded, avoid an unnecessary LB process compared with a solution of sending the downlink data in many times, and may reduce a probability that the uplink control information is discarded compared with a solution of directly discarding the uplink control information.

In some embodiments, the time resource may be one or more subframes.

In some embodiments, the method of FIG. 3 may further include that: the downlink data is sent on the second time resource.

In some embodiments, the method of FIG. 3 may further include that: the terminal sends the uplink control information via the third time resource.

In the embodiment of the disclosure, downlink sending via the third time resource ensures that the uplink control information is not discarded.

In some embodiments, the method of FIG. 3 may further include that: responsive to a condition that a time interval between the first time resource and the third time resource is smaller than T, the terminal sends the uplink control information via the third time resource. Here, T represents a sending period of the uplink control information. Furthermore, responsive to a condition that the time interval between the first time resource and the third time resource is more than or equal to T, the terminal may discard the uplink control information.

Figure 5:
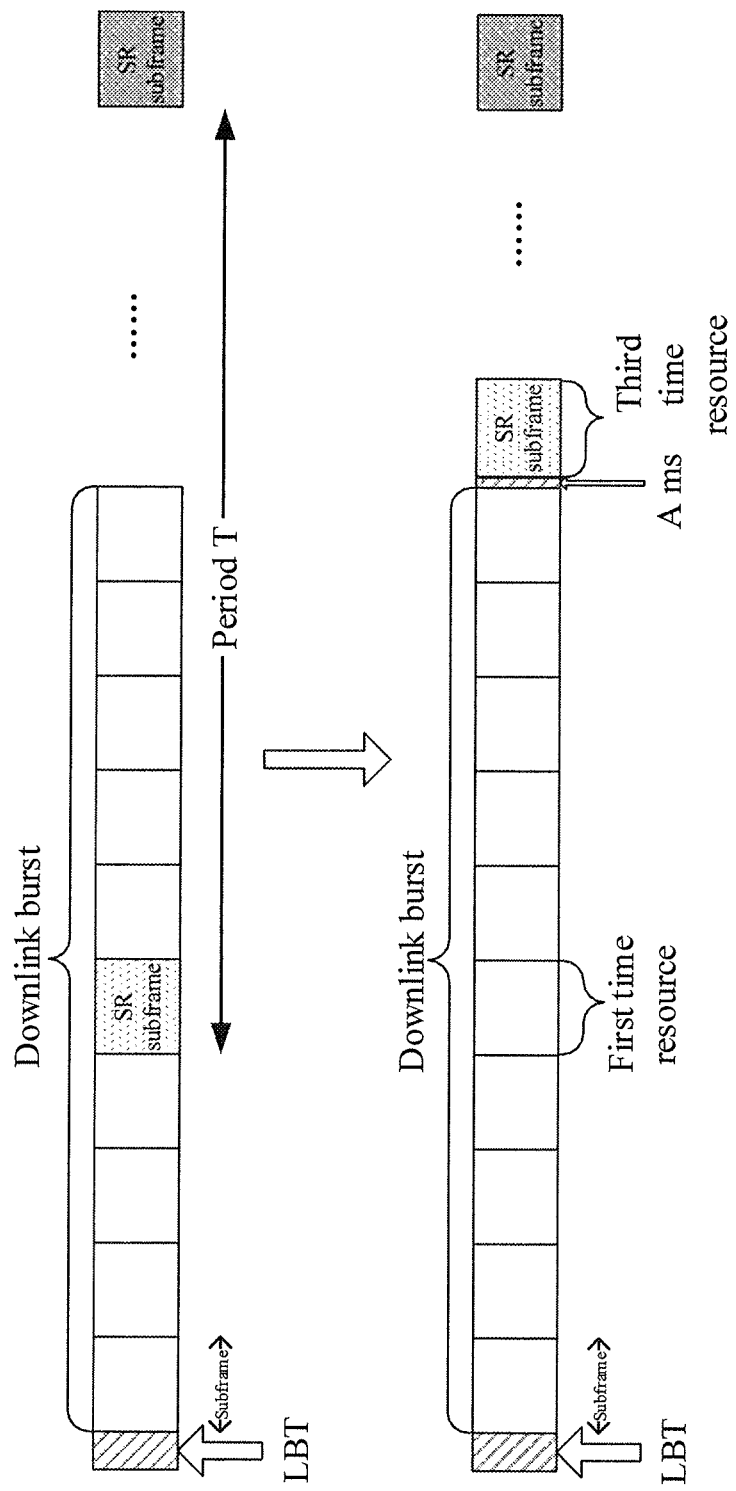
FIG. 5 is an example diagram of a collision scheme according to an embodiment of the disclosure.

In an example, referring to FIG. 5, the time interval between the third time resource and the first time resource is smaller than the period T of the SR subframe, and at this moment, the uplink control information may be sent via the third time resource.

In some embodiments, the method of FIG. 3 may further include that: responsive to a condition that the time interval between the first time resource and the third time resource is less than or equal to (T-Q), the terminal sends the uplink control information via the third time resource. Here, T represents the sending period of the uplink control information, and Q is a preset parameter.

If there still exists a collision between the third time resource re-determined by the terminal and a time resource allocated to other information, signal or channel, some collision schemes will be given below in combination with specific embodiments.

In some embodiments, the method of FIG. 3 may further include that: the terminal determines that the third time resource and a fourth time resource, which is configured to transmit or receive first target information, are at least partially overlapped (or, the fourth time resource has been occupied by the first target information in advance); and the terminal sends or receives only the first target information via the fourth time resource and does not send the uplink control information.

In the embodiment of the disclosure, when there exists the collision between the third time resource and the fourth time resource, which is configured to transmit or receive the first target information, the uplink control information may be discarded, and the first target information is sent via the fourth time resource. Therefore, smooth sending of the first target information may be ensured.

Specifically, in some examples, the third time resource and the fourth time resource may be completely overlapped. In some examples, the first target information may be information with a higher priority than the uplink control information. The first target information includes at least one of a Physical Broadcast Channel (PBCH); a Physical Random Access Channel (PRACH); a synchronization signal; ACK/NACK information; nonperiodic CSI; an SR; a Channel State Information Reference Signal (CSI-RS); a Cell Reference Signal (CRS); or an uplink Sounding Reference Signal (SRS).

In some embodiments, before the operation that the terminal determines that the third time resource and the fourth time resource, which is configured to transmit or receive the first target information, are at least partially overlapped, the method may further include that: the terminal determines that the time interval between the first time resource and the third time resource is smaller than T. Here, T represents the sending period of the uplink control information. Furthermore, if the terminal determines that the time interval between the first time resource and the third time resource is more than or equal to T, the terminal may discard the uplink control information.

In some embodiments, before the operation that the terminal determines that the third time resource and the fourth time resource, which is configured to transmit or receive the first target information, are at least partially overlapped, the method may further include that: the terminal determines that the time interval between the first time resource and the third time resource is less than or equal to (T-Q), T representing the sending period of the uplink control information and Q being the preset parameter. Furthermore, if the terminal determines that the time interval between the first time resource and the third time resource is larger than (T-Q), the terminal may discard the uplink control information.

In some embodiments, the method of FIG. 3 may further include that: the terminal determines that the third time resource and a fifth time resource, which is configured to transmit or receive second target information, are at least partially overlapped; and the terminal sends or receives the uplink control information and the second target information via the third time resource and/or the fifth time resource.

In the embodiment of the disclosure, when there exists a collision between the third time resource and the fifth time resource, which is configured to transmit or receive the second target information, the uplink control information and the second target information may be sent together. Therefore, the uplink control information may be prevented from being discarded.

In some embodiments, before the operation that the terminal determines that the third time resource and the fifth time resource, which is configured to transmit or receive the second target information, are at least partially overlapped, the method may further include that: the terminal determines that the time interval between the first time resource and the third time resource is smaller than T. Here, T represents the sending period of the uplink control information. Furthermore, if the terminal determines that the time interval between the first time resource and the third time resource is more than or equal to T, the terminal may discard the uplink control information.

In some embodiments, before the operation that the terminal determines that the third time resource and the fifth time resource, which is configured to transmit or receive the second target information, are at least partially overlapped, the method may further include that: the terminal determines that the time interval between the first time resource and the third time resource is less than or equal to (T-Q). T represents the sending period of the uplink control information and Q being the preset parameter. Furthermore, if the terminal determines that the time interval between the first time resource and the third time resource is larger than (T-Q), the terminal may discard the uplink control information.

In some examples, the third time resource and the fifth time resource may completely be overlapped. In some examples, the second target information includes at least one of the ACK/NACK information; information born in a PUSCH; SR information; or periodic CSI.

In some embodiments, the second time resource is configured to transmit downlink burst data. For example, the second time resource includes multiple continuous downlink subframes.

In some embodiments, time lengths of the third time resource and the first time resource are equal to each other. In some embodiments, the time lengths of the third time resource and the fifth time resource are unequal.

The method for sending the uplink control information according to the embodiments of the disclosure is described above in combination with FIGS. 1-5 from the angle of the terminal in detail, the method for sending the uplink control information according to the embodiments of the disclosure will be described below in conjunction with FIG. 6 from the angle of the base station.

It will be understood that interaction between the terminal and the base station, related characteristics and functions and the like described on a base station side correspond to descriptions on a UE side, and repeated descriptions are properly omitted for simplicity.

Figure 6:
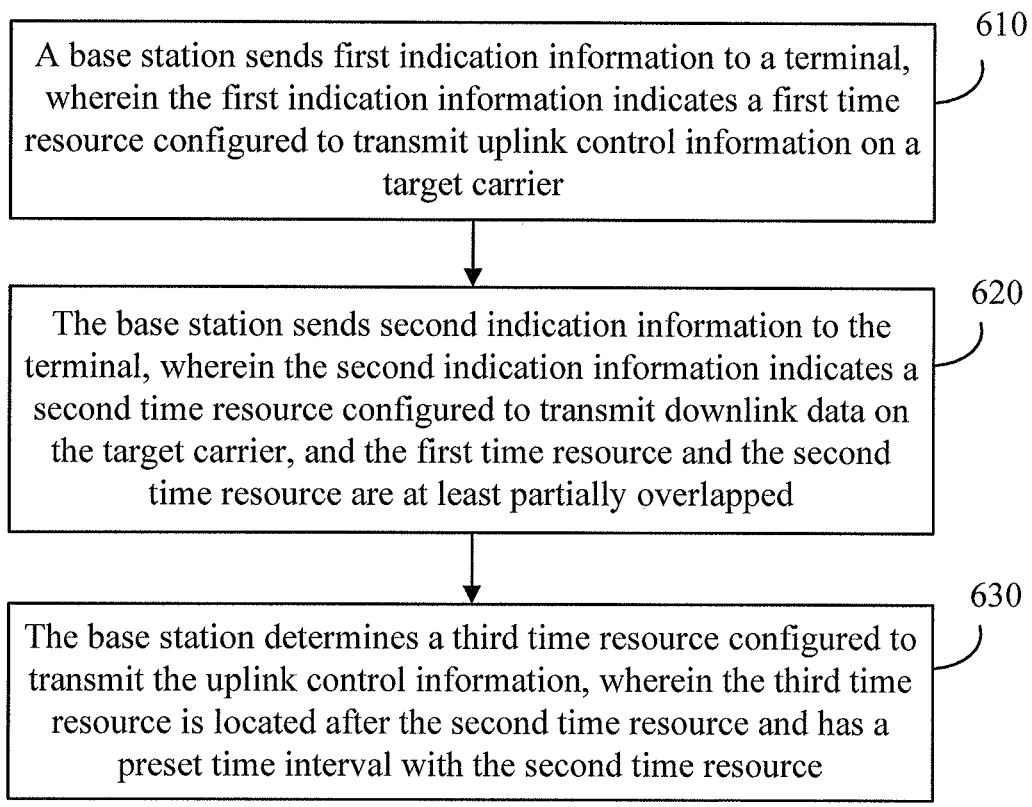
FIG. 6 is a schematic flowchart of a method for sending uplink control information according to an embodiment of the disclosure.

FIG. 6 is a schematic flowchart of a method for sending uplink control information according to an embodiment of the disclosure. The method is characterized by including the following operations.

In 610, a base station sends first indication information to a terminal. The first indication information indicates a first time resource, which is configured to transmit uplink control information, on a target carrier.

In 620, the base station sends second indication information to the terminal. The second indication information indicates a second time resource, which is configured to transmit downlink data, on the target carrier. Here, the first time resource and the second time resource are at least partially overlapped.

In 630, the base station determines a third time resource configured to transmit the uplink control information. The third time resource is located after the second time resource and has a preset time interval with the second time resource.

Optionally, in an embodiment, the method of FIG. 6 further includes that: the base station receives the uplink control information via the third time resource.

Optionally, in an embodiment, the method of FIG. 6 further includes that: responsive to a condition that a time interval between the first time resource and the third time resource is smaller than T, the base station receives the uplink control information via the third time resource. Here, T represents a sending period of the uplink control information.

Optionally, in an embodiment, the method of FIG. 6 further includes that: responsive to a condition that the time interval between the first time resource and the third time resource is less than or equal to (T-Q), the base station receives the uplink control information via the third time resource. Here, T represents the sending period of the uplink control information, and Q is a preset parameter.

Optionally, in an embodiment, the method of FIG. 6 further includes that: the base station determines that the third time resource and a fourth time resource, which is configured to transmit or receive first target information, are at least partially overlapped; and the base station sends or receives only the first target information via the fourth time resource.

Optionally, in an embodiment, before the operation that the base station determines that the third time resource and the fourth time resource, which is configured to transmit or receive the first target information, are at least partially overlapped, the method of FIG. 6 further includes that: the base station determines that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the first target information includes at least one of a PBCH; a PRACH; a synchronization signal; ACK/NACK information; CSI; an SR; a CSI-RS; a CRS; or an uplink SRS.

Optionally, in an embodiment, the method of FIG. 6 further includes that: the base station determines that the third time resource and a fifth time resource, which is configured to transmit or receive second target information, are at least partially overlapped; and the base station sends or receives the uplink control information and the second target information via the third time resource and/or the fifth time resource.

Optionally, in an embodiment, before the operation that the base station determines that the third time resource and the fifth time resource, which is configured to transmit or receive the second target information, are at least partially overlapped, the method of FIG. 6 further includes that: the base station determines that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the second target information includes at least one of the ACK/NACK information; information born in a PUSCH; SR information; or periodic CSI.

Optionally, in an embodiment, the uplink control information includes at least one of the SR information or the CSI.

Optionally, in an embodiment, the target carrier is a carried on an unlicensed frequency band.

Optionally, in an embodiment, time lengths of the third time resource and the first time resource are equal to each other.

The method for sending the uplink control information according to the embodiments of the disclosure is described above in combination with FIG. 1 to FIG. 6 in detail. A terminal and base station according to the embodiments of the disclosure will be described below in combination with FIG. 7 to FIG. 10 in detail. It will be understood that the terminal and base station in FIG. 7 to FIG. 10 may implement each operation executed by the terminal and the base station in FIG. 1 to FIG. 6 and will not be elaborated herein to avoid repetitions.

Figure 7:
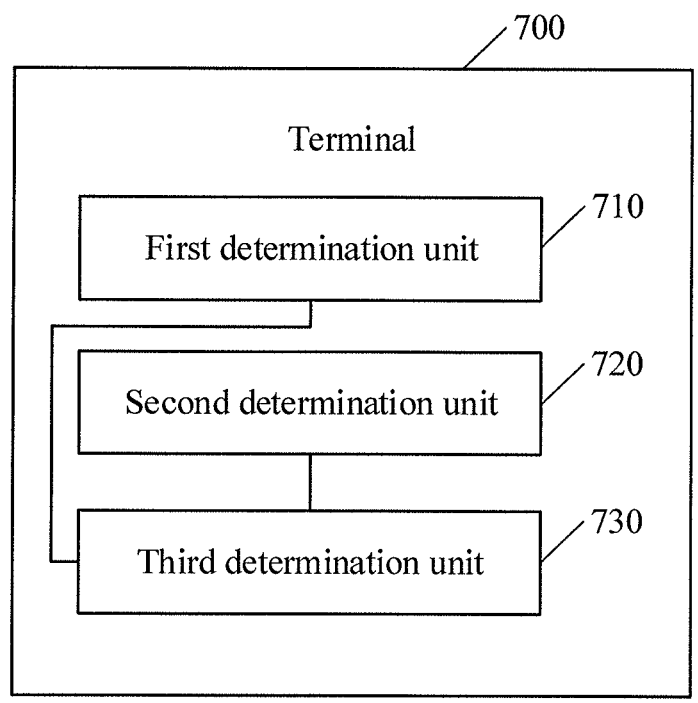
FIG. 7 is a schematic diagram of configuration of a terminal according to an embodiment of the disclosure.

FIG. 7 is a schematic diagram of configuration of a terminal according to an embodiment of the disclosure. The terminal 700 of FIG. 7 includes a first determination unit 710, a second determination unit 720 and a third determination unit 730.

The first determination unit 710 is configured to determine a first time resource, which is configured to transmit uplink control information, on a target carrier according to first indication information sent by a base station.

The second determination unit 720 is configured to determine a second time resource, which is configured to transmit downlink data, on the target carrier according to second indication information sent by the base station. Here, the first time resource and the second time resource are at least partially overlapped.

The third determination unit 730 is configured to determine a third time resource configured to transmit the uplink control information. The third time resource is located after the second time resource and has a preset time interval with the second time resource.

Optionally, in an embodiment, the terminal 700 further includes a first transceiver unit configured to send the uplink control information via the third time resource.

Optionally, in an embodiment, the terminal 700 further includes a second transceiver unit configured to, responsive to a condition that a time interval between the first time resource and the third time resource is smaller than T, send the uplink control information via the third time resource. Here, T represents a sending period of the uplink control information.

Optionally, in an embodiment, the terminal further includes a third transceiver unit configured to, responsive to a condition that the time interval between the first time resource and the third time resource is less than or equal to (T-Q), send the uplink control information via the third time resource. Here, T represents the sending period of the uplink control information, and Q is a preset parameter.

Optionally, in an embodiment, the terminal 700 further includes a fourth determination unit configured to determine that the third time resource and a fourth time resource, which is configured to transmit or receive first target information, are at least partially overlapped; and a fourth transceiver unit configured to send or receive only the first target information via the fourth time resource.

Optionally, in an embodiment, the terminal 700 further includes a fifth determination unit configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the first target information includes at least one of a PBCH; a PRACH; a synchronization signal; ACK/NACK information; CSI; an SR; a CSI-RS; a CRS; or an uplink SRS.

Optionally, in an embodiment, the terminal 700 further includes a sixth determination unit configured to determine that the third time resource and a fifth time resource, which is configured to transmit or receive second target information, are at least partially overlapped; and a fifth transceiver unit configured to send or receive the uplink control information and the second target information via the third time resource and/or the fifth time resource.

Optionally, in an embodiment, the terminal 700 further includes a seventh determination unit configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the second target information includes at least one of the ACK/NACK information; information born in a PUSCH; SR information; or periodic CSI.

Optionally, in an embodiment, the uplink control information includes at least one of the SR information; or the CSI.

Optionally, in an embodiment, the target carrier is a carrier on an unlicensed frequency band.

Optionally, in an embodiment, time lengths of the third time resource and the first time resource are equal to each other.

Figure 8:
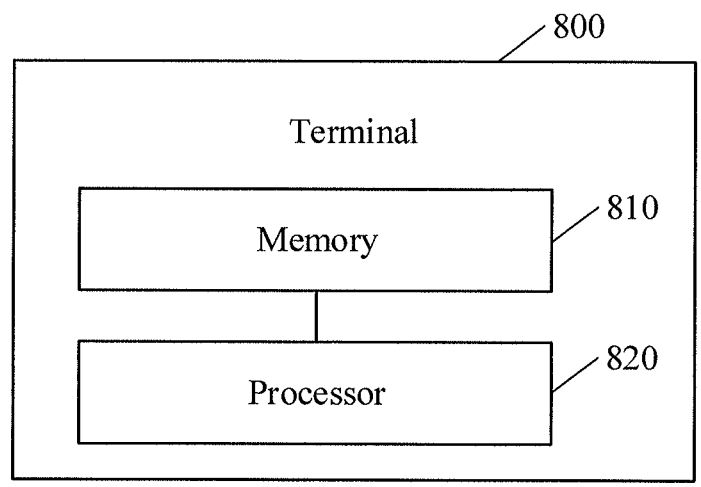
FIG. 8 is a schematic diagram of configuration of a terminal according to an embodiment of the disclosure.

FIG. 8 is a schematic diagram of configuration of a terminal according to an embodiment of the disclosure. The terminal 800 of FIG. 8 includes a memory 810 and a processor 820.

The memory 810 is configured to store a program.

The processor 820 is configured to execute the program. Here, when the program is executed, the processor 820 is specifically configured to: determine a first time resource, which is configured to transmit uplink control information, on a target carrier according to first indication information sent by a base station; determine a second time resource, which is configured to transmit downlink data, on the target carrier according to second indication information sent by the base station, wherein the first time resource and the second time resource are at least partially overlapped; and determine a third time resource configured to transmit the uplink control information. The third time resource is located after the second time resource and has a preset time interval with the second time resource.

Optionally, in an embodiment, the terminal 800 further includes a transceiver, configured to transmit the uplink control information via the third time resource.

Optionally, in an embodiment, the terminal 800 further includes a transceiver, configured to, responsive to a condition that a time interval between the first time resource and the third time resource is smaller than T, send the uplink control information via the third time resource. Here, T represents a sending period of the uplink control information.

Optionally, in an embodiment, the terminal 800 further includes a transceiver, configured to, responsive to a condition that the time interval between the first time resource and the third time resource is less than or equal to (T-Q), send the uplink control information via the third time resource. Here, T represents the sending period of the uplink control information, and Q is a preset parameter.

Optionally, in an embodiment, the processor 820 is further configured to determine that the third time resource and a fourth time resource, which is configured to transmit or receive first target information, are at least partially overlapped; and the terminal further includes a transceiver, configured to transmit or receive only the first target information via the fourth time resource.

Optionally, in an embodiment, the processor 820 is further configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the first target information includes at least one of a PBCH; a PRACH; a synchronization signal; ACK/NACK information; CSI; an SR; a CSI-RS; a CRS; or an uplink SRS.

Optionally, in an embodiment, the processor 820 is further configured to determine that the third time resource and a fifth time resource, which is configured to transmit or receive second target information, are at least partially overlapped; and the terminal further includes a transceiver, configured to transmit or receive the uplink control information and the second target information via the third time resource and/or the fifth time resource.

Optionally, in an embodiment, the processor 820 is further configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the second target information includes at least one of the ACK/NACK information; information born in a PUSCH; SR information; or periodic CSI.

Optionally, in an embodiment, the uplink control information includes at least one of the SR information; or the CSI.

Optionally, in an embodiment, the target carrier is a carrier on an unlicensed frequency band.

Optionally, in an embodiment, time lengths of the third time resource and the first time resource are equal to each other.

Figure 9:
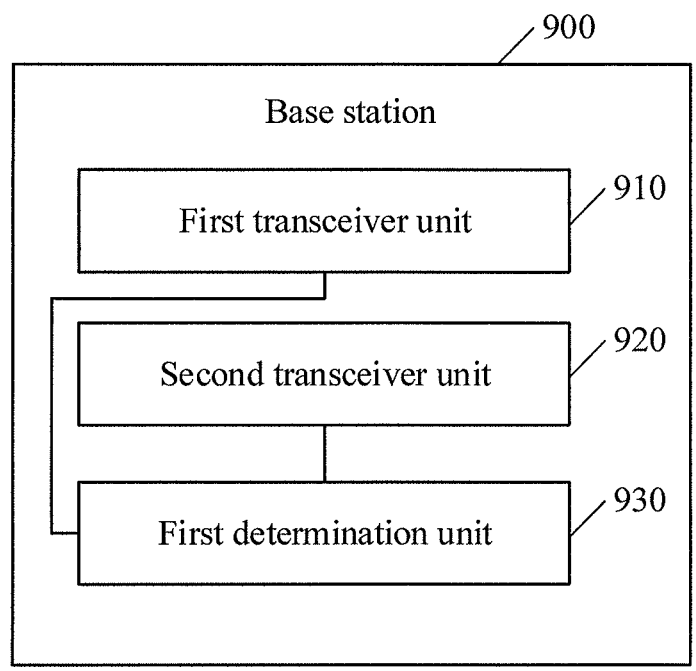
FIG. 9 is a schematic diagram of configuration of a base station according to an embodiment of the disclosure.

FIG. 9 is a schematic diagram of configuration of a base station according to an embodiment of the disclosure. The base station 900 of FIG. 9 includes a first transceiver unit 910, a second transceiver unit 920 and a first determination unit 930.

The first transceiver unit 910 is configured to send first indication information to a terminal. The first indication information indicates a first time resource, which is configured to transmit uplink control information, on a target carrier.

The second transceiver unit 920 is configured to send second indication information to the terminal. The second indication information indicates a second time resource, which is configured to transmit downlink data, on the target carrier. Here, the first time resource and the second time resource are at least partially overlapped.

T first determination unit 930 is configured to determine a third time resource configured to transmit the uplink control information. The third time resource is located after the second time resource and has a preset time interval with the second time resource.

Optionally, in an embodiment, the base station 900 further includes a third transceiver unit configured to receive the uplink control information via the third time resource.

Optionally, in an embodiment, the base station 900 further includes a fourth transceiver unit configured to, responsive to a condition that a time interval between the first time resource and the third time resource is smaller than T, receive the uplink control information via the third time resource. Here, T represents a sending period of the uplink control information.

Optionally, in an embodiment, the base station 900 further includes a fifth transceiver unit configured to, responsive to a condition that the time interval between the first time resource and the third time resource is less than or equal to (T-Q), receive the uplink control information via the third time resource. Here, T represents the sending period of the uplink control information, and Q is a preset parameter.

Optionally, in an embodiment, the base station 900 further includes a second determination unit configured to determine that the third time resource and a fourth time resource, which is configured to transmit or receive first target information, are at least partially overlapped; and a sixth transceiver unit configured to send or receive only the first target information via the fourth time resource.

Optionally, in an embodiment, the base station 900 further includes a third determination unit configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the first target information includes at least one of a PBCH; a PRACH; a synchronization signal; ACK/NACK information; CSI; an SR; a CSI-RS; a CRS; or an uplink SRS.

Optionally, in an embodiment, the base station 900 further includes a fourth determination unit configured to determine that the third time resource and a fifth time resource, which is configured to transmit or receive second target information, are at least partially overlapped; and a seventh transceiver unit configured to send or receive the uplink control information and the second target information via the third time resource and/or the fifth time resource.

Optionally, in an embodiment, the base station 900 further includes a fifth determination unit configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the second target information includes at least one of the ACK/NACK information; information born in a PUSCH; SR information; or periodic CSI.

Optionally, in an embodiment, the uplink control information includes at least one of the SR information; or the CSI.

Optionally, in an embodiment, the target carrier is a carried on an unlicensed frequency band.

Optionally, in an embodiment, time lengths of the third time resource and the first time resource are equal to each other.

Figure 10:
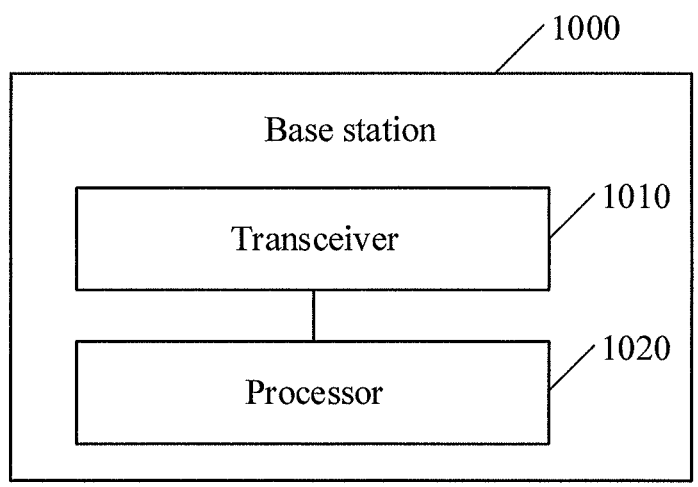
FIG. 10 is a schematic diagram of configuration of a base station according to an embodiment of the disclosure.

FIG. 10 is a schematic diagram of configuration of a base station according to an embodiment of the disclosure. The base station 100 of FIG. 10 includes a transceiver 1010 and a processor 1020.

The transceiver 1010 is configured to transmit first indication information to a terminal. The first indication information indicates a first time resource, which is configured to transmit uplink control information, on a target carrier. And the transceiver 1010 is configured to transmit second indication information to the terminal. The second indication information indicates a second time resource, which is configured to transmit downlink data, on the target carrier. Here, the first time resource and the second time resource are at least partially overlapped.

The processor 1020 is configured to determine a third time resource configured to transmit the uplink control information. The third time resource is located after the second time resource and has a preset time interval with the second time resource.

Optionally, in an embodiment, the transceiver 1010 is further configured to receive the uplink control information via the third time resource.

Optionally, in an embodiment, the transceiver 1010 is further configured to, responsive to a condition that a time interval between the first time resource and the third time resource is smaller than T, receive the uplink control information via the third time resource. Here, T represents a sending period of the uplink control information.

Optionally, in an embodiment, the transceiver 1010 is further configured to, responsive to a condition that the time interval between the first time resource and the third time resource is less than or equal to (T-Q), receive the uplink control information via the third time resource. Here, T represents the sending period of the uplink control information, and Q is a preset parameter.

Optionally, in an embodiment, the processor 1020 is further configured to determine that the third time resource and a fourth time resource, which is configured to transmit or receive first target information, are at least partially overlapped; and a sixth transceiver unit is configured to send or receive only the first target information via the fourth time resource.

Optionally, in an embodiment, the processor 1020 is further configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the first target information includes at least one of a PBCH; a PRACH; a synchronization signal; ACK/NACK information; CSI; an SR; a CSI-RS; a CRS; or an uplink SRS.

Optionally, in an embodiment, the processor 1020 is further configured to determine that the third time resource and a fifth time resource, which is configured to transmit or receive second target information, are at least partially overlapped; and a seventh transceiver unit is configured to send or receive the uplink control information and the second target information via the third time resource and/or the fifth time resource.

Optionally, in an embodiment, the processor 1020 is further configured to determine that the time interval between the first time resource and the third time resource is smaller than T or the time interval between the first time resource and the third time resource is less than or equal to (T-Q). Here, T represents the sending period of the uplink control information, and Q is the preset parameter.

Optionally, in an embodiment, the second target information includes at least one of the ACK/NACK information; information born in a PUSCH; SR information; or periodic CSI.

Optionally, in an embodiment, the uplink control information includes at least one of the SR information; or the CSI.

Optionally, in an embodiment, the target carrier is a carried on an unlicensed frequency band.

Optionally, in an embodiment, time lengths of the third time resource and the first time resource are equal to each other.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it will be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes various media capable of storing program codes such as a U disk, a mobile hard disk, a Read-Only Memory (ROM), a Random Access Memory (RAM), a magnetic disk or an optical disk.

Only specific implementations of the disclosure are described and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for sending uplink control information, comprising:
  determining, by a terminal, a first time resource, which is configured to transmit the uplink control information, on a target carrier according to first indication information sent by a base station, the uplink control information comprising Channel State Information (CSI);
  determining, by the terminal, a second time resource, which is configured to transmit downlink data, on the target carrier according to second indication information sent by the base station;
  in case that the first time resource and the second time resource are at least partially overlapped,
    determining, by the terminal, a third time resource configured to transmit the uplink control information, the third time resource being located after the second time resource and having a preset time interval with the second time resource, the preset time interval being greater than 0; and
    sending, by the terminal, the uplink control information via the third time resource;
  wherein the method further comprises:
  determining, by the terminal, that the third time resource and a fourth time resource, which is configured to transmit first target information, are at least partially overlapped, the first target information comprising Acknowledgement (ACK)/Negative Acknowledgement (NACK) information; and
  sending, the terminal, only the first target information via the fourth time resource.

2. The method as claimed in claim 1, further comprising:
  responsive to a condition that a time interval between the first time resource and the third time resource is smaller than T, sending, by the terminal, the uplink control information via the third time resource, wherein T represents a sending period of the uplink control information.

3. The method as claimed in claim 1, further comprising:
  responsive to a condition that the time interval between the first time resource and the third time resource is less than or equal to (T-Q), sending, by the terminal, the uplink control information via the third time resource, wherein T represents sending period of the uplink control information, and Q is a preset parameter.

4. The method as claimed in claim 1, before determining, by the terminal, that the third time resource and the fourth time resource, which is configured to transmit the first target information, are at least partially overlapped, further comprising:
  determining, by the terminal, that a time interval between the first time resource and the third time resource is smaller than T or the time interval between the first time resource and the third time resource is less than or equal to (T-Q), wherein T represents sending period of the uplink control information, and Q is preset parameter.

5. The method as claimed in claim 1, wherein the first target information further comprises at least one of:
  a Physical Broadcast Channel (PBCH);
  a Physical Random Access Channel (PRACH);
  a synchronization signal;
  nonperiodic CSI;
  a Scheduling Request (SR);
  a Channel State Information Reference Signal (CSI-RS);
  a Cell Reference Signal (CRS); or
  an uplink Sounding Reference Signal (SRS).

6. The method as claimed in claim 1, further comprising:
  determining, by the terminal, that the third time resource and a fifth time resource, which is configured to transmit or receive second target information, are at least partially overlapped; and
  sending or receiving, by the terminal, the uplink control information and the second target information via the third time resource and/or the fifth time resource.

7. The method as claimed in claim 6, before determining, by the terminal, that the third time resource and the fifth time resource, which is configured to transmit or receive the second target information, are at least partially overlapped, further comprising:
  determining, by the terminal, that a time interval between the first time resource and the third time resource is smaller than T or a time interval between the first time resource and the third time resource is less than or equal to (T-Q), wherein T represents the sending period of the uplink control information, and Q is preset parameter.

8. The method as claimed in claim 6, wherein the second target information comprises at least one of:
  Acknowledgement (ACK)/Negative Acknowledgement (NACK) information;
  information born in a Physical Uplink Shared Channel (PUSCH);
  SR information; and
  periodic CSI.

9. The method as claimed in claim 1, wherein the uplink control information further comprises the SR information.

10. The method as claimed in claim 1, wherein the target carrier is a carrier on an unlicensed frequency band.

11. The method as claimed in claim 1, wherein time lengths of the third time resource and the first time resource are equal to each other.

12. A method for sending uplink control information, comprising:
  sending, by a base station, first indication information to a terminal, the first indication information indicating a first time resource, which is configured to transmit the uplink control information, on a target carrier, the uplink control information comprising Channel State Information (CSI);
  sending, by the base station, second indication information to the terminal, the second indication information indicating a second time resource, which is configured to transmit downlink data, on the target carrier,
  in case that the first time resource and the second time resource are at least partially overlapped,
    determining, by the base station, a third time resource configured to transmit the uplink control information, the third time resource being located after the second time resource and having a preset time interval with the second time resource, the preset time interval being greater than 0; and receiving, by the base station, the uplink control information via the third time resource;

wherein the method further comprises:

determining, by the base station, that the third time resource and a fourth time resource, which is configured to receive first target information, are at least partially overlapped: the first target information comprising Acknowledgement (ACK)/Negative Acknowledgement (NACK) information; and receiving, by the base station, only the first target information via, the fourth time resource.

13. A terminal, comprising:

a processor; and a memory configured to store an instruction executable for the processor, wherein the processor is configured to:

determine a first time resource, which is configured to transmit uplink control information, on a target carrier according to first indication information sent by a base station, the uplink control information comprising Channel State Information (CSI); and determine a second time resource, which is configured to transmit downlink data, on the target carrier according to second indication information sent by the base station, wherein the processor is further configured to: in case that the first time resource and the second time resource are at least partially overlapped, determine a third time resource configured to transmit the uplink control information, the third time resource being located after the second time resource and having a preset time interval with the second time resource, the preset time interval being greater than 0;

wherein the terminal further comprises a transceiver configured to send the uplink control information via the third time resource;

wherein the processor is further configured to determine that the third time resource and a fourth time resource, which is configured to transmit first target information, are at least partially overlapped; the first target information comprising Acknowledgement (ACK)/Negative Acknowledgement (NACK) information; and the transceiver is further configured to send only the first target information via the fourth time resource.

14. The terminal as claimed in claim 13, wherein the transceiver is further configured to:

responsive to a condition that a time interval between the first time resource and the third time resource is smaller than T, send the uplink control information via the third time resource, wherein T represents a sending period of the uplink control information.

15. The terminal as claimed in claim 13, wherein the transceiver is further configured to:

responsive to a condition that the time interval between the first time resource and the third time resource is less than or equal to (T-Q), send the uplink control information via the third time resource, wherein T represents sending period of the uplink control information, and Q is a preset parameter.

16. The terminal as claimed in claim 13, wherein the first target information further comprises at least one of:

a Physical Broadcast Channel (PBCH);

a Physical Random Access Channel (PRACH);

a synchronization signal;

nonperiodic CSI a Scheduling Request (SR);

a Channel State Information Reference Signal (CSI-RS);

a Cell Reference Signal (CRS); or an uplink Sounding Reference Signal (SRS).

17. The terminal as claimed in claim 16, wherein the processor is further configured to determine that the time interval between the first time resource and the third time resource is smaller than T or the time interval between the first time resource and the third time resource is less than or equal to (T-Q), wherein T represents sending period of the uplink control information, and Q is preset parameter.

* * * * *